A. R. PARTRIDGE.
PROCESS AND APPARATUS FOR RECLAIMING AND REFINING COPPER AND OTHER METALS.
APPLICATION FILED SEPT. 15, 1919.
1,352,912. Patented Sept. 14, 1920.
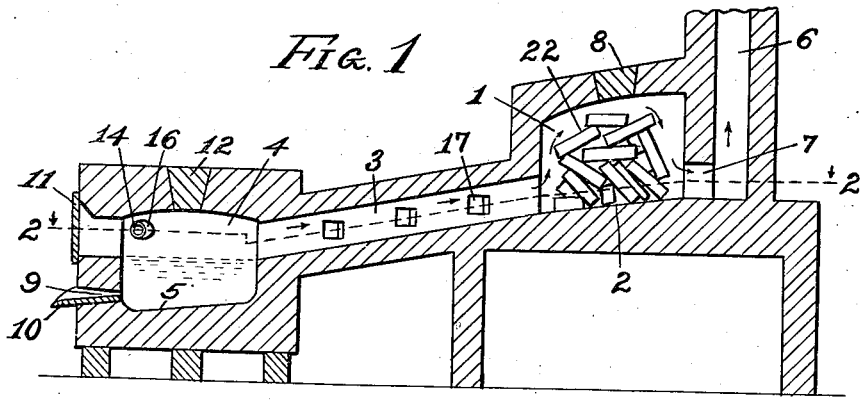
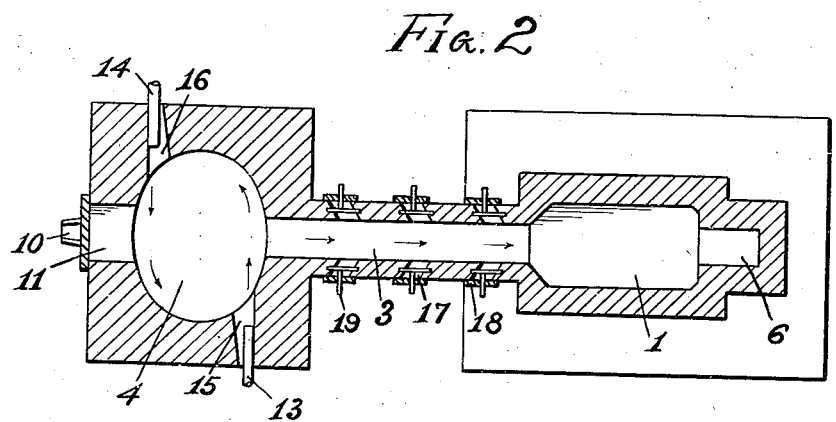
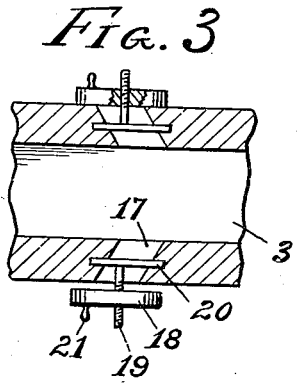
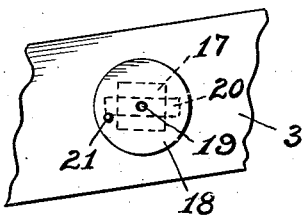
Inventor
A. R. Partridge
By G. E. Dunstan,
his Attorney

UNITED STATES PATENT OFFICE.

ALLEN R. PARTRIDGE, OF CLEVELAND, OHIO.

PROCESS AND APPARATUS FOR RECLAIMING AND REFINING COPPER AND OTHER METALS.

1,352,912.   Specification of Letters Patent.   Patented Sept. 14, 1920.

Application filed September 15, 1919. Serial No. 323,863.

*To all whom it may concern:*

Be it known that I, ALLEN R. PARTRIDGE, a citizen of the United States, residing at Cleveland, in the county of Cuyahoga and State of Ohio, have invented certain new and useful Improvements in Processes and Apparatus for Reclaiming and Refining Copper and other Metals, of which the following is a specification.

This invention relates to a new and useful method of reclaiming and refining copper and other materials and to apparatus for accomplishing the same.

The main object of this invention is to reclaim and refine copper and other materials in a single and continuous operation in such a manner as to obtain the full amount of pure copper or other material to be reclaimed at the lowest cost.

In order that the invention may be clearly understood, the same will be hereinafter fully described as illustrated in the accompanying drawings, and the novel features thereof will be particularly pointed out in the appended claims.

Although the following description will refer more specifically to the reclaiming and refining of copper, it will be understood that lead and nickel, some of the rare metals, such as vanadium and tungsten, and even precious metals, as silver and gold, may be reclaimed and refined by means of this invention. Also that the apparatus may be used as a melting furnace for the manufacture of composition metals, such as brasses, bronzes and babbitts, and even the smelting of metal from raw ores.

In the drawings similar characters are used to designate corresponding parts.

Figure 1 is a longitudinal sectional elevation of a furnace for the carrying out of the process of this invention, Fig. 2 is a plan sectional view taken on line 2—2 of Fig. 1, Fig. 3 is an enlarged sectional view of the conduit, Fig. 4 is a similar view looking at the side thereof.

The process consists in heating the materials from which copper is to be reclaimed to several degrees above their melting point, then reducing the temperature to a point which causes said materials to "sweat" and trickle slowly down a conduit, and then admitting air to the tiny trickling stream for oxidizing each particle thereof to purify the copper being reclaimed. In this manner, oxygen is brought into direct contact with every particle of the "sweating" materials and thus purifies the copper to be recovered.

The apparatus for carrying out the above, comprises a charging or sweating hearth 1 having an inclined bottom 2, from the lower side of which extends an inclined conduit 3, leading to the upper part of a refining hearth 4 also having an inclined bottom 5. A chimney 6 is connected to the charging or sweating hearth 1 by a flue 7. Said charging or sweating hearth may be of any desired form and is provided with a suitable charging door 8, but the refining hearth 4 is preferably oval in shape and is provided with the usual tap hole 9 and drawing-off spout 10, and a suitable skimming door at 11, besides a polling opening 12. Heat may be supplied to the upper part of the hearth in any suitable manner but as shown, consists of introducing oil burners, indicated by 13 and 14, into openings 15 and 16 respectively, which are located at opposite sides of the hearth and diagonally across from each other. By thus arranging said burners, a rotary circulation is produced within said hearth, and the heated gases travel up the inclined conduit 3 and into the charging or sweating hearth 1 for melting and sweating the materials therein, and the same trickle down upon the bottom of the conduit 3. Air is admitted by means of a plurality of inlets 17 arranged at each side of said conduit for supplying oxygen to said sweating materials, and said inlets are inclined toward the chimney for admitting the air in the natural direction of the draft. Depending upon the materials being treated, atmospheric and other conditions, it is necessary to be able to close the inlets 17 or only admit the proper amount of air, and for this purpose adjustable covers 18 are provided at said inlets. Said covers are rotatably mounted upon threaded pins 19, which are fixed to bars 20 extending across the air inlets 17 and held in the sides thereof.

In practice, the materials from which copper or other metals are to be reclaimed and refined are placed within the charging or sweating hearth 1 as designated by 22, and the heated gases produced by the burners 13 and 14, rotate in the refining hearth 4, and travel up the inclined conduit 3 to said materials. At first the heat is of sufficient temperature to melt said materials and then is reduced to a proper temperature for causing said materials to "sweat" and trickle slowly down upon the bottom of the conduit 3 into the refining hearth 4. The air inlet covers 18 are closed or opened to admit the proper amount of oxygen to the tiny trickling stream of molten material flowing down the conduit 3, and as the oxygen comes into direct contact with every particle of said flowing material, the copper or other material to be reclaimed is purified. The impurities are skimmed off at 11, and the pure copper or other materials being reclaimed are drawn off at the spout 10.

Having fully described my invention, what I claim is:

1. A process for reclaiming and refining metals consisting in heating the materials from which the metals are to be reclaimed to a melting temperature, then reducing the heat to cause said materials to "sweat" and trickle down an incline, and then admitting oxygen to the trickling material for purifying the same, substantially as described.

2. A process for reclaiming and refining metals consisting in heating the materials from which the metals are to be reclaimed above the melting point, then reducing the heat to a sweating temperature, and then admitting oxygen to the sweating materials, substantially as described.

3. In an apparatus for reclaiming and refining metals, the combination of a charging hearth, an incline extending from the charging hearth, and means for admitting air to the incline, substantially as described.

4. In an apparatus for reclaiming and refining metals, the combination of a charging hearth, an inclined conduit extending from the charging hearth, and means for admitting air to said conduit, substantially as described.

5. In an apparatus for reclaiming and refining metals, the combination of a charging hearth, an inclined conduit extending from the charging hearth, the conduit being provided with air inlets, and means for controlling the amount of air admitted to the conduit, substantially as described.

6. In an apparatus for reclaiming and refining metals, the combination of a charging hearth, a refining hearth, an inclined conduit connecting the charging hearth and the refining hearth, and means for admitting air to said conduit, substantially as described.

7. In an apparatus for reclaiming and refining metals, the combination of a charging hearth, a refining hearth, an inclined conduit connecting the charging hearth and the refining hearth, the conduit being provided with air inlets, and means for controlling the amount of air admitted to the conduit, substantially as described.

8. In an apparatus for reclaiming and refining metals, the combination of a charging hearth, a refining hearth, a conduit connecting said hearths, and means for heating the refining hearth, substantially as described.

9. In an apparatus for reclaiming and refining metals, the combination of a charging hearth, a refining hearth, an inclined conduit connecting said hearths, means for heating the refining hearth, and means for admitting air to said conduit, substantially as described.

10. In an apparatus for reclaiming and refining metals, the combination of a charging hearth, a refining hearth, a conduit inclined downwardly from the charging hearth to the refining hearth, means for introducing heat within the refining hearth, and means for admitting air to said conduit, substantially as described.

11. In an apparatus for reclaiming and refining metals, the combination of a charging hearth, a refining hearth, an inclined conduit connecting said hearths, means for heating the refining hearth, the conduit having air inlets, covers for the air inlets, and the covers being rotatably and adjustably mounted for controlling the amount of air admitted at said inlets, substantially as described.

In testimony whereof I affix my signature.

ALLEN R. PARTRIDGE.